(12) United States Patent
Lin

(10) Patent No.: US 6,831,540 B1
(45) Date of Patent: Dec. 14, 2004

(54) MAGNETIZER

(76) Inventor: Kuo-Shu Lin, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/417,008

(22) Filed: Apr. 14, 2003

(51) Int. Cl.[7] .......................... H01F 13/00; F02B 51/00; C02F 1/48
(52) U.S. Cl. ..................... 335/284; 210/222; 123/536
(58) Field of Search ..................... 335/284; 361/143; 210/222, 384; 123/532–538

(56) References Cited

U.S. PATENT DOCUMENTS

| | | | | |
|---|---|---|---|---|
| 4,188,296 A | * | 2/1980 | Fujita ........................ | 210/222 |
| 4,605,498 A | * | 8/1986 | Kulish ....................... | 210/222 |
| 4,755,288 A | * | 7/1988 | Mitchell et al. .............. | 210/85 |
| 4,808,306 A | * | 2/1989 | Mitchell et al. ............. | 210/222 |
| 5,063,368 A | * | 11/1991 | Ettehadieh .................. | 335/301 |
| 5,070,852 A | * | 12/1991 | Po et al. ..................... | 123/538 |
| 5,129,382 A | * | 7/1992 | Stamps et al. ............... | 123/536 |
| 5,319,335 A | * | 6/1994 | Huang et al. ................ | 335/284 |
| 5,331,807 A | * | 7/1994 | Hricak ........................ | 60/275 |
| 5,348,050 A | * | 9/1994 | Ashton ....................... | 137/827 |
| 5,454,943 A | * | 10/1995 | Ashton et al. ............... | 210/222 |
| 5,664,546 A | * | 9/1997 | De La Torre Barreiro .. | 123/538 |
| 5,861,789 A | * | 1/1999 | Bundy et al. ................ | 335/285 |
| 6,094,119 A | * | 7/2000 | Reznik et al. ............... | 335/284 |
| 6,377,147 B1 | * | 4/2002 | Chang ........................ | 335/296 |
| 6,596,163 B1 | * | 7/2003 | Parker ........................ | 210/222 |

FOREIGN PATENT DOCUMENTS

JP 01253216 A * 10/1989 ........... H01F/13/00

OTHER PUBLICATIONS

WO 9309342A published May 13, 1993.*

* cited by examiner

Primary Examiner—Lincoln Donovan
Assistant Examiner—Bernard Rojas
(74) Attorney, Agent, or Firm—Charles E. Baxley

(57) ABSTRACT

A magnetizer has a pair of magnetism exciters, a magnetism emitting block, a pair of magnets, and a hollow casing. The magnetism emitting block is disposed between the magnetism exciters. Each magnet is disposed between the magnetism emitting block and the corresponding magnetism exciter. The magnetism exciters is made of a high magnetic permeable material. The magnetism emitting block is made of a super magnetic permeable material. Each magnet is made of a permanent magnetic element. The hollow casing is made of a non-magnetic material.

7 Claims, 3 Drawing Sheets

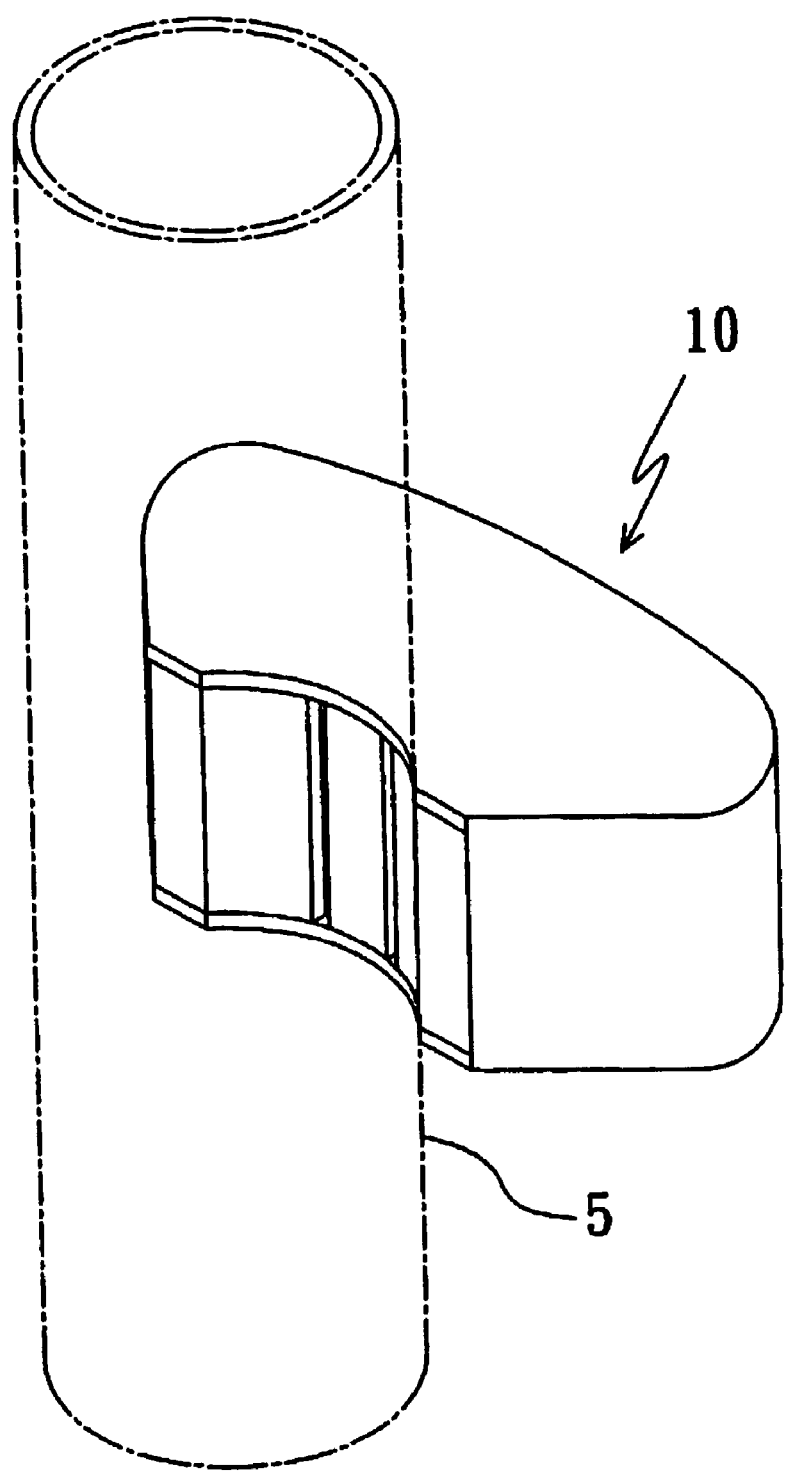
F I G. 3

MAGNETIZER

BACKGROUND OF THE INVENTION

The present invention relates to a magnetizer. More particularly, the present invention relates to a magnetizer which is disposed on a pipe so that an inner wall of the pipe will have a negativity while a fluid flows into the pipe.

When water flows into a pipe, an inner wall of the pipe will have a positivity so that anions such as dissolved oxygens will be adsorbed on the inner wall of the pipe to corrode the inner wall of the pipe.

Oxygens and hydrocarbon molecules are fuels of an internal combustion engine. However, both oxygens and hydrocarbon molecules have negative electrons to repulse one another so that a combustion of the internal combustion engine is not complete.

SUMMARY OF THE INVENTION

An object of the present invention is to provide a magnetizer which is disposed on a pipe so that an inner wall of the pipe will have a negativity while a fluid flows into the pipe.

Another object of the present invention is to provide a magnetizer which is disposed on an internal combustion engine to force oxygens and hydrocarbon molecules to be mixed completely.

Accordingly, a magnetizer comprises a pair of magnetism exciters, a magnetism emitting block, a pair of magnets, and a hollow casing. The magnetism emitting block is disposed between the magnetism exciters. Each of the magnets is disposed between the magnetism emitting block and the corresponding magnetism exciter. Each of the magnetism exciters is made of a high magnetic permeable material. The magnetism emitting block is made of a super magnetic permeable material. Each of the magnets is made of a permanent magnetic element. The hollow casing is made of a non-magnetic material.

BRIEF DESCRIPTION OF THE DRAWINGS

FIG. 3 is a schematic view illustrating an application of a magnetizer of a preferred embodiment in accordance with the present invention.

DETAILED DESCRIPTION OF THE INVENTION

Figure 1:
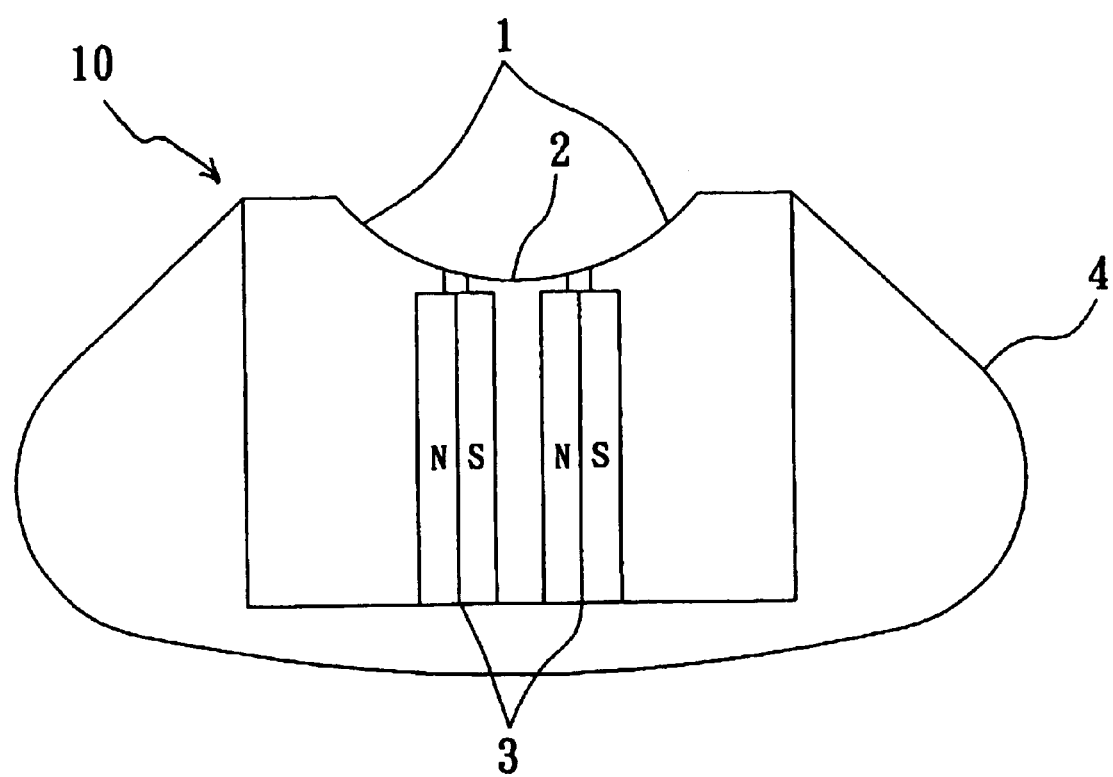
FIG. 1 is a schematic view illustrating an assembly of a magnetizer of a preferred embodiment in accordance with the present invention.
Figure 2:
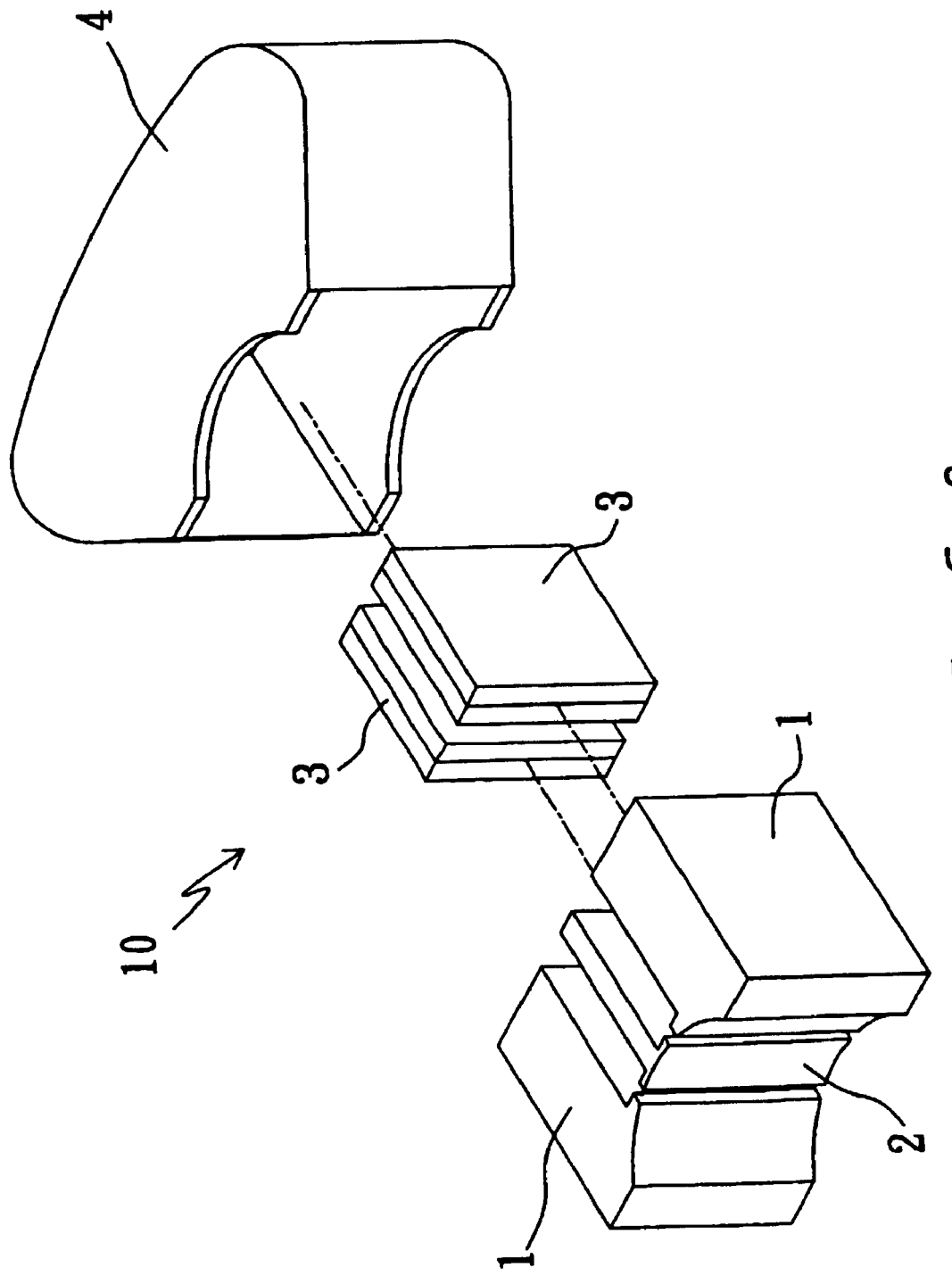
FIG. 2 is a perspective exploded view of a magnetizer of a preferred embodiment in accordance with the present invention.

Referring to FIGS. 1 to 3, a magnetizer 10 comprises a pair of magnetism exciters 1, a magnetism emitting block 2, a pair of magnets 3, and a hollow casing 4.

The magnetism emitting block 2 is disposed between the magnetism exciters 1.

Each of the magnets 3 is disposed between the magnetism emitting block 2 and the corresponding magnetism exciter 1.

Each of the magnetism exciters 1 is made of a high magnetic permeable material such as an iron or a metal having a magnetic permeability.

The magnetism emitting block 2 is made of a super magnetic permeable material such as an iron or a metal having a magnetic permeability.

Each of the magnets 3 is made of a permanent magnetic element.

The hollow casing 4 is made of a non-magnetic material such as a metal or a plastics made by an injection molding method.

The magnetizer 10 is disposed on a pipe 5.

The present invention has the following advantages. When the magnetizer is disposed on a pipe, an inner wall of the pipe will have a negativity while a fluid flows into the pipe. Therefore, anions such as dissolved oxygens will not be adsorbed on the inner wall of the pipe.

When the magnetizer is disposed on an internal combustion engine, oxygens and hydrocarbon molecules will be mixed completely.

The invention is not limited to the above embodiment but various modification thereof may be made. Further, various changes in form and detail may be made without departing from the scope of the invention.

I claim:

1. A magnetizer comprises:

a pair of magnetism exciters, a magnetism emitting block, a pair of magnets, and a hollow casing, the magnetism emitting block disposed between the magnetism exciters, each of the magnets disposed between the magnetism emitting block and the corresponding magnetism exciter, each of the magnetism exciters made of a high magnetic permeable material, the magnetism emitting block made of a super magnetic permeable material, each of the magnets made of a permanent magnetic element, and the hollow casing made of a non-magnetic material.

2. The magnetizer as claimed in claim 1, wherein the hollow casing is a metal.

3. The magnetizer as claimed in claim 1, wherein the hollow casing is a plastics.

4. The magnetizer as claimed in claim 1, wherein each of the magnetism exciters is a metal having a magnetic permeability.

5. The magnetizer as claimed in claim 1, wherein each of the magnetism exciters is an iron.

6. The magnetizer as claimed in claim 1, wherein the magnetism emitting block is a metal having a magnetic permeability.

7. The magnetizer as claimed in claim 1, wherein the magnetism emitting block is an iron.

\* \* \* \* \*